Nov. 1, 1966  W. M. McCONNELL  3,282,444
APPARATUS FOR HANDLING ELONGATED ARTICLES
Filed April 30, 1965  3 Sheets-Sheet 1
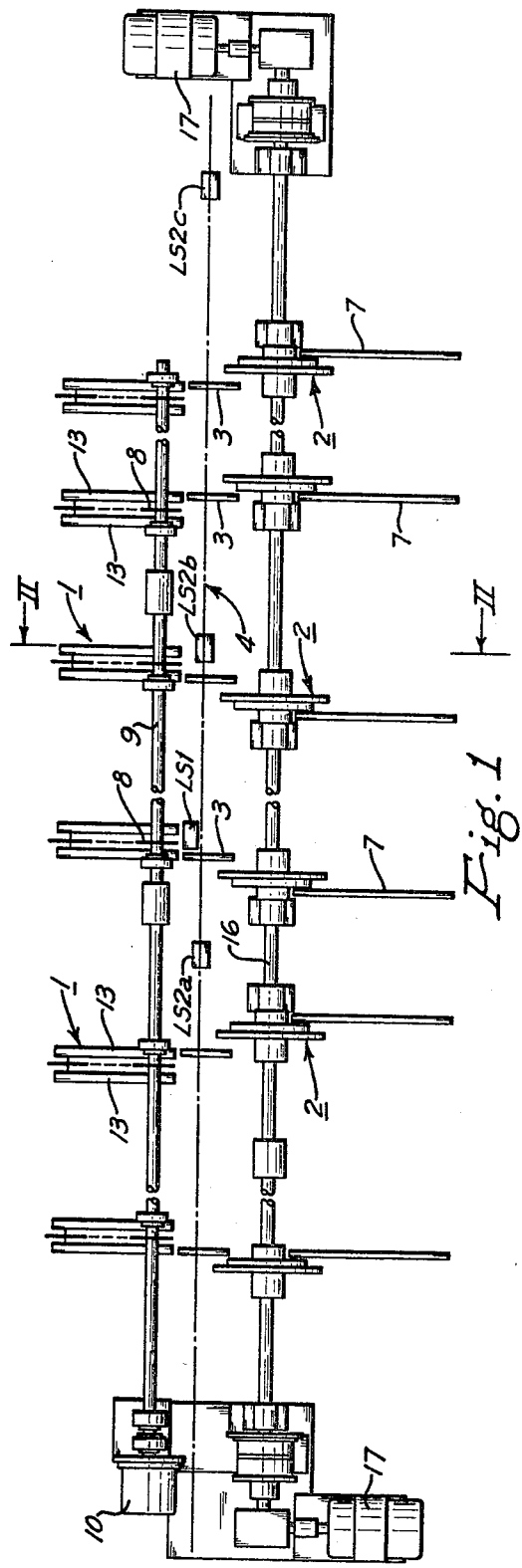
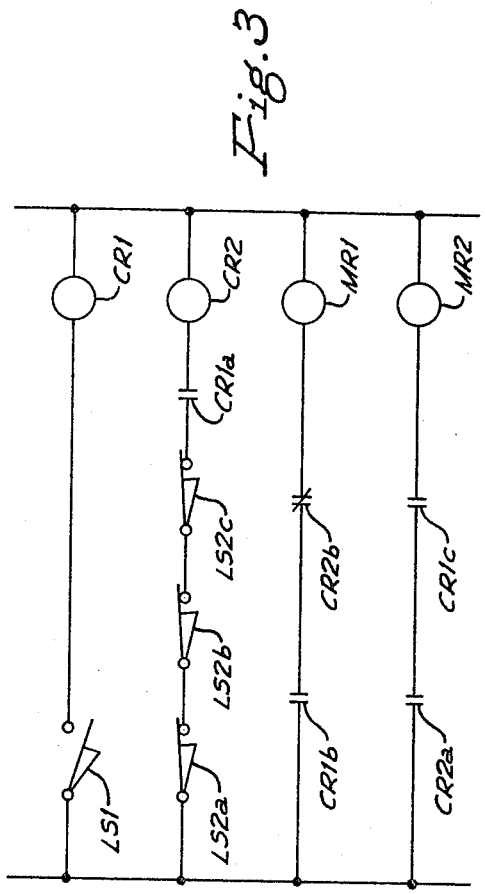
INVENTOR.
WILLIAM M. McCONNELL
BY
ATTORNEYS.

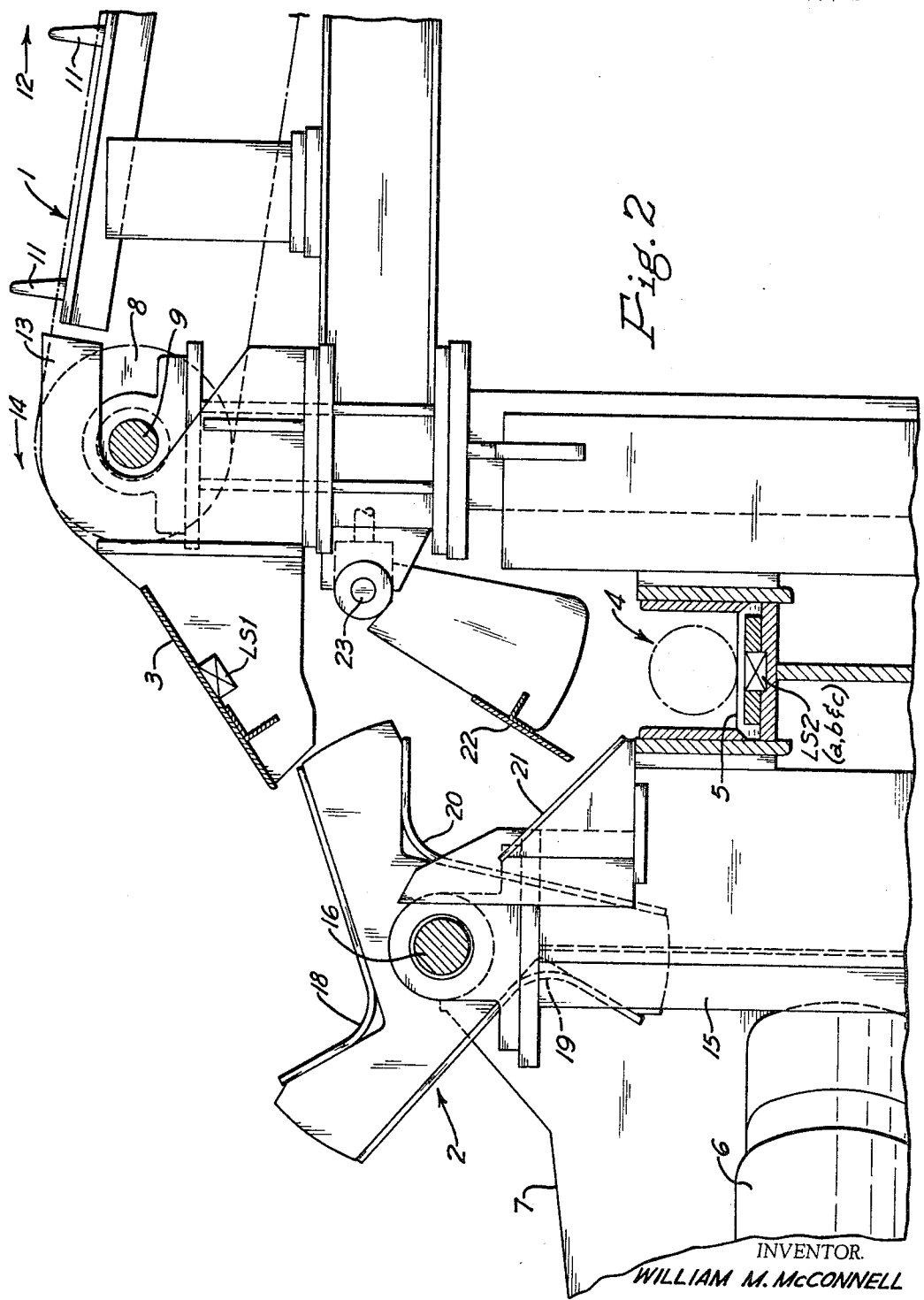

Nov. 1, 1966  W. M. McCONNELL  3,282,444
APPARATUS FOR HANDLING ELONGATED ARTICLES
Filed April 30, 1965  3 Sheets-Sheet 3

INVENTOR.
WILLIAM M. McCONNELL
BY
ATTORNEYS.

United States Patent Office 3,282,444
Patented Nov. 1, 1966

3,282,444
APPARATUS FOR HANDLING ELONGATED
ARTICLES
William M. McConnell, Pittsburgh, Pa., assignor to Taylor-Wilson Manufacturing Company, Pittsburgh, Pa., a corporation of Pennsylvania
Filed Apr. 30, 1965, Ser. No. 452,173
5 Claims. (Cl. 214—1)

This invention relates to machines for handling elongated articles and more particularly to apparatus which receives lengths of pipe, bars, rods, tubes and the like and delivers same to a station or bypass same from or around the station in the event that another article already occupies the station. The apparatus finds special application in regulation of feed of pipe to one or more stations at which a work operation such as straightening, threading, chamfering, tapering, cutting, etc., are performed. In the event that a pipe is already at the work station when a second one arrives for delivery thereto, the apparatus bypasses the pipe from the work station to a second work station or to a pipe receiver or collector. Thus, this apparatus regulates feed of the pipe to one or more stations and achieves a free flow of pipe without a buildup or jamup of same on the entry side of the work station.

Heretofore, feed of the pipe and the like to a station at which a work operation was performed thereupon encountered a buildup of the pipe on the entry side of the station due to delays at the station. This pipe buildup also resulted from delivery of an excessive number of pipe which could not be handled by the machine at the station so that an effective and simple apparatus for handling the pipe the pipe to avoid the buildup has been needed.

Our invention achieves an efficient, regulated feed of pipe to one or more stations and avoids the buildup on the entry side of the station through bypassing pipe from the station in the event that another one already occupies the station. More specifically, the invention resides in apparatus for handling elongated articles having a conveyor for advancing the articles for delivery to a station and comprises at least two spaced apart movable transfer members disposed for receiving the elongated article from the conveyor. These transfer members are movable between a first position whereat they receive the article from the conveyor and deliver it to a station and a second position whereat they receive the article from the conveyor and deliver it to a means for bypassing the article from the station. Operatively connected to the transfer members is a motor for moving same between the first and second positions and a control connected to the motor regulates movement of the transfer members between the first and second positions. This control includes a first sensing means located for detecting presence of the article advanced by the conveyor and disposed for delivery to the station and a second sensing means located for detecting presence of the article at the station. This second sensing means is responsive to presence of the article at the station for preventing the transfer members moving from the second position to the first position. The first sensing means is responsive to absence of the article at the station for operating the motor and thereby moving the transfer members from the second position to the first position for delivery of the article to the station.

In a modification of my invention it comprises at least two spaced apart rotatable disc-like members disposed for receiving an article from the conveyor. Each disc includes at least one spaced apart article-receiving and supporting portion which is open at the periphery of the discs, extends inwardly therefrom and is adapted to support therein the article. These discs are movable from a first position whereat they receive the article in the article portion from the conveyor to a second position whereat they deliver the article to the station. The discs are also rotatable from the first position to a third position whereat they bypass the article from the station. Operatively connected to the discs for moving them between the first and second positions and between the first and third positions is a motor. A control means connected to the motor regulates movement of the discs and this control includes a first sensing means disposed for detecting presence of the article on the disc and a second sensing means for detecting presence of the article at the station. The second sensing means is responsive to presence of the article at the station for preventing delivery of a succeeding article to the station and thereby causes the discs to bypass the succeeding article from the station. The first sensing means is responsive to absence of the article from the station and thereby causes the discs to deliver the article to the station.

In the accompanying drawings I have shown preferred embodiments of my invention, in which:

FIGURE 1 is a plan view of one embodiment of elongated article-handling apparatus for feeding pipe to a pipe straightener;

FIGURE 2 is an enlarged view along the line II—II of FIGURE 1;

FIGURE 3 is a fragmentary schematic wiring diagram of a control circuit which regulates operation of the apparatus of FIGURE 1;

Figure 4:
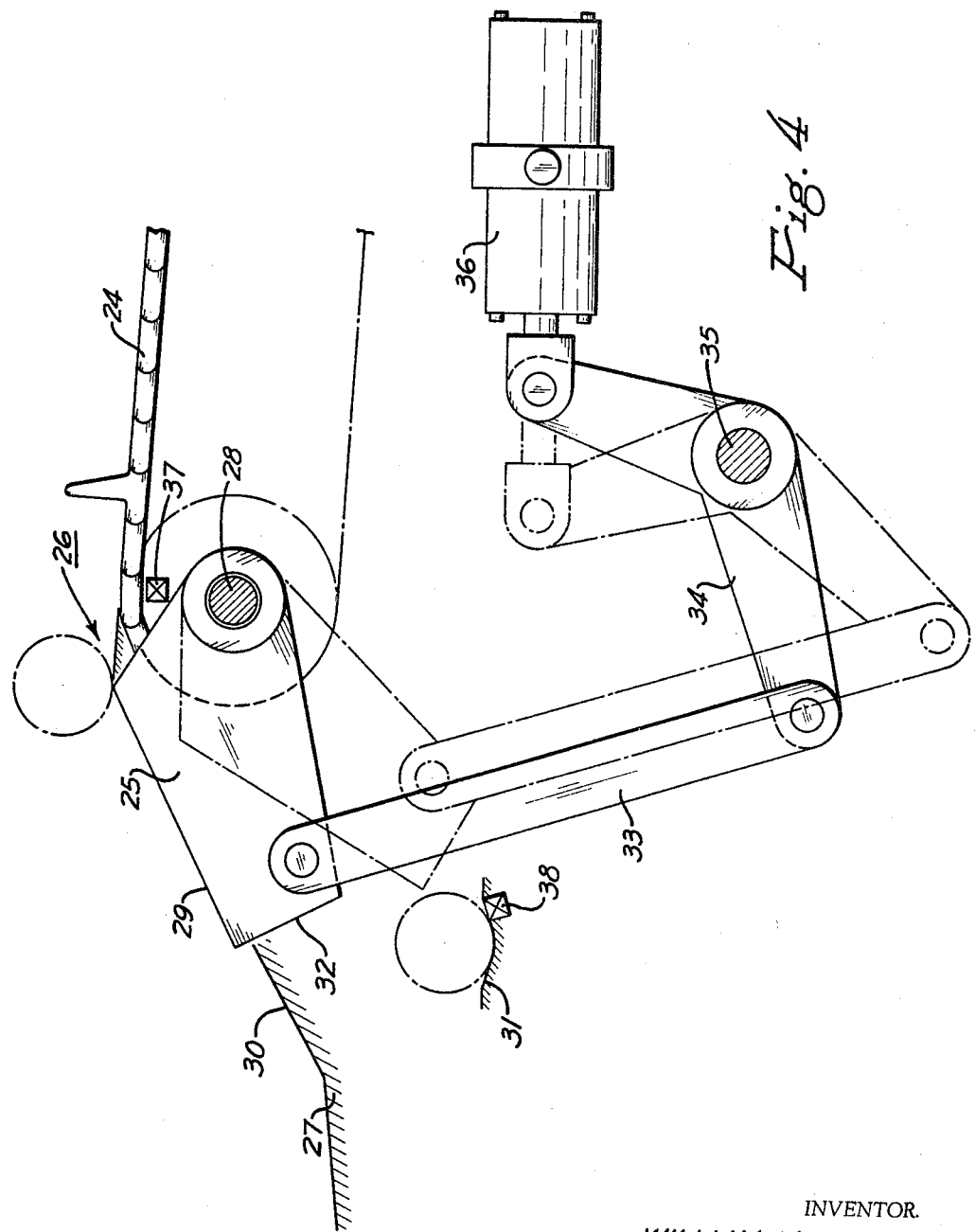
FIGURE 4 is a side elevation view partially in section of a second embodiment of my invention.

Referring to FIGURES 1 and 2, a chain conveyor 1 receives lengths of pipe to be straightened and advances them singly and transversely of their lengths to a plurality of spaced apart disc members or starwheels 2 which receive the pipe from downwardly sloping ramps 3 extending between the exit end of the chain conveyor 1 and the starwheels themselves. These starwheels are disposed for delivery of the pipe to a station 4 comprising conveyor rolls 5 which lead to a pipe straightener. Motors, such as motor 6, turn the conveyor rolls 5 to move the pipe through the straightener machine (not shown but to the right of the apparatus viewing FIGURE 1). In the event the station 4 is already occupied by a pipe then the starwheels bypass the pipe over the station by transferring same onto exit skids 7 which extend transversely away from the station 4.

The chain conveyor 1 includes a plurality of sprockets 8 mounted upon a driven shaft 9 which is connected to a motor 10 (FIGURE 1). Upwardly projecting spaced apart dogs 11 carried by the chain engage a single length of pipe at the entry side 12 of the chain conveyor and advance it over skids 13 to the exit end 14 of the chain conveyor for delivery over the ramps 3 to the starwheels 2.

A frame 15 supports a horizontally extending drive shaft 16 which mounts the starwheels and receives torque from electric motors 17 connected to each end thereof so that all the starwheels rotate in unison. These wheels are located just beyond the lowermost end of the ramps 3 in a position to receive pipe therefrom. As shown in FIGURE 2, each starwheel has three spaced apart pockets 18, 19 and 20 or pipe-receiving portions which are open at the periphery of the wheel, extend inwardly therefrom and have sufficient size to contain the pipe.

As shown, the exit skids 7 are to the left of the starwheels (viewing FIGURE 2) and alongside a portion thereof whereby rotation of same in a counterclockwise direction from the position of FIGURE 2 transfers a pipe in pocket 18 onto the exit skids which slope downwardly away from the starwheels.

Disposed to the right of the starwheels and beneath the ramps 3 is the station 4 formed by the conveyor rolls 5 driven by the motors 6. Located close to one side of the starwheels is a plurality of spaced apart station skids 21 which incline downwardly from the starwheels to the station 4 for delivery of the pipe thereto. When the starwheels rotate in a clockwise direction from the position of FIGURE 2 pocket 18 advances to deposit a pipe therein upon the station skids 21 so that this pipe then rolls onto the conveyor rolls. Opposite the station skids, extending toward same and terminating short of engagement therewith are a plurality of slow-down deflector gates 22 pivotally mounted at their upper ends to a horizontal axle 23 supported below the ramps 3 on the frame 15. A spring (not shown) upon the axle urges the slowdown gates into the position of FIGURE 2. Thus, the deflector plates prevent the pipe entering the station with an excessive impacting force.

The three pockets of each starwheel are so positioned there-around that when one pocket is at a first position whereat it receives pipe from the chain conveyor a second pocket is at a second position, i.e., opposite the entry side of the exit skids 7 for delivery of pipe thereon. Simultaneously, the third pocket is in a third position, opposite the station skids for deposit of pipe thereupon.

Operation of the motors 17 which rotate the starwheels between the first and second positions and between the first and third positions is through a control circuit which includes four proximity switches LS1, LS2a, LS2b and LS2c with switch LS1 disposed adjacent the ramp 3 to detect delivery of a pipe into a pocket of the starwheels. The other three proximity switches are disposed along the length of the roller conveyor as shown in FIGURE 1 and detect presence of the pipe in the station 4. These four proximity switches are in the circuit of FIGURE 3 and determine which direction the starwheels rotate, i.e., in a counterclockwise direction to bypass pipe from the station or in a clockwise direction to deliver pipe to the station.

Referring to FIGURE 3, rolling of pipe over the ramp closes switch LS1 which actuates relay CR1 and closes normally open contacts CR1a, CR1b and CR1c. If there is no pipe in the station the normally closed proximity switches LS2a, b and c then operate relay CR2 which causes contact CR2a in the circuit of relay MR2 for effecting operation of the motors to rotate the starwheels in a clockwise direction and transfer pipe to the station. Operation of relay CR2 opens the normally closed contact CR2b in the circuit of relay MR1 and thereby prevents operation of the motors to rotate the starwheels in a counterclockwise direction. However, if pipe is in the station 4, the normally closed switches LS2a, b and c are open so that closing switch LS1 operates relay CR1 and in turn relay MR1 to actuate the motors and rotate the starwheels in a counterclockwise direction to transfer the pipe onto the exit skids 7.

FIGURE 4 shows a second embodiment of my invention in which a chain conveyor 24 similar to the conveyor 1 in FIGURE 1 advances pipe to a plurality of spaced apart movable transfer members or gates 25 disposed similarly to the starwheels of FIGURE 1 relative to the chain conveyor. Each gate extends downwardly from the exit end 26 of the chain conveyor 24 to exit skids 27 and is pivotally mounted upon a horizontally extending shaft 28 located below the exit end of the chain conveyor. The gates are so disposed at the exit end of the chain conveyor that they receive pipe from this conveyor and the upper surface 29 of the gates is above the upper surface 30 of the exit skids so that pipe rolls over the gates onto the skids.

Beneath the entry side of the exit skids is a roller conveyor 31 similar to the roller conveyor of FIGURE 1 and placed to receive pipe from the gates when they are rotated about their pivot mounting from a first position (shown in solid lines) whereat they extend between the chain conveyor 24 and the exit skids 27 to a second position (shown in dash lines, FIGURE 4). In this second position the gates extend between the chain conveyor and the entry side of the roller conveyor whereby pipe from the conveyor 24 travels over the gates onto the roller conveyor 31.

Connected to the end 32 of each gate remote from the chain conveyor is one end of a link member 33 whose other end is joined to a crank-arm combination 34 pivotally mounted upon a shaft 35. This link member extends downwardly from its connection to the gates to the junction with the crank-arm combination. A fluid under pressure motor 36 attached to the crank-arm combination operates the combination to raise and lower the link member and thereby move the gates between their first and second positions. Solenoid actuated valves (not shown) regulate flow of fluid under pressure to the motor and thereby control its operation.

Adjacent the exit end of the chain conveyor is a first proximity switch 37 which detects advancement of a pipe to the gates and spaced apart along the length of the roller conveyor 31 are three proximity switches (one, 38, being shown) similar to those of FIGURE 1. These three proximity switches detect presence of pipe upon the roller conveyor and the four proximity switches are in a circuit similar to FIGURE 3 whereby they regulate operation of the fluid under pressure motor 36 for transfer of pipe from the chain conveyor onto the exit skids 27 in the event a pipe is already at the station and on the roller conveyor or delivery of pipe onto the roller conveyor in the event same is not already occupied by the pipe. Accordingly, detailed explanation of the circuitry which regulates operation of the fluid under pressure motor is believed unnecessary in view of FIGURE 3 and the explanation associated therewith.

My invention has important advantages which include automatic operation to smoothly regulate feed of elongated articles such as pipe to a station without buildup or interruption of flow of pipe. In the event the station is already occupied by a pipe, the next succeeding one is automatically bypassed around or over the station and this continues until the pipe in the station has cleared same at which time the next pipe to arrive for delivery to the station is fed thereto.

While I have shown and described the preferred embodiments of my invention it may be otherwise embodied within the scope of the appended claims.

I claim:

1. In apparatus for handling elongated articles having conveyor means for advancing an elongated article for delivery to a first station, the invention comprising at least two spaced apart movable transfer members disposed for receiving said elongated article from said conveyor means, said transfer members being movable between a first position whereat they receive said article from said conveyor means and deliver it to a station and a second position whereat they receive said article from said conveyor means and deliver it to means for bypassing said article from said station, motor means operatively connected to said transfer members for moving same between said first and second positions, control means connected to said motor means for regulating movement of said transfer members between said first and second positions, said control means including first sensing means located for detecting presence of said article advanced by said conveyor means and disposed for delivery to said station and including second sensing means located for detecting presence of said article at said station, said second sensing means being responsive to presence of said article at said station for preventing said transfer members moving from said second position to said first position, said first sensing means being responsive to absence of said article at said station to operate said motor means and move said transfer members from said second position to said first position to deliver said article to said station.

2. The invention of claim 1 wherein said movable transfer members are pivotally mounted gates.

3. In apparatus for handling elongated articles having conveyor means for advancing an elongated article for delivery to a station the invention comprising at least two spaced apart rotatable disc-like members disposed for receiving said article from said conveyor means, each said disc including at least one spaced apart article-receiving end supporting portion, which is open at the periphery of said disc, extends inwardly therefrom and is adapted to support therein said article, said discs being movable from a first position whereat they receive in said article portion said article from said conveyor to a second position whereat they deliver said article to a station, said discs also being rotatable from said first position to a third position whereat they bypass said article from said station, motor means operatively connected to said discs for moving same between said first and second positions and said first and third positions, control means connected to said motor means for regulating movement of said discs, said control means including a first sensing means disposed for detecting presence of said article on said discs and second sensing means located for detecting presence of said article at said station, said second sensing means being responsive to presence of said article at said station and preventing delivery of said article to said station and causing said discs to bypass said article from said station, said first sensing means being responsive to absence of said article from said station and thereby cause said discs to deliver said article to said station.

4. The invention of claim 3 wherein each of said disc members have at least two of said article-receiving portions spaced apart around their disc an amount such that when one portion is at one of said second and third positions the other portion is at said first position.

5. The invention of claim 3 wherein each of said disc members have at least three of said article-receiving portions spaced apart around their disc an amount such that when one portion is at said first position, there is a portion at each of said second and third positions.

References Cited by the Examiner
UNITED STATES PATENTS

| | | | |
|---|---|---|---|
| 2,609,095 | 9/1952 | Graham et al. | 214—1 X |
| 2,763,236 | 9/1956 | Cummings | 214—1 X |
| 3,206,002 | 9/1965 | Hartenstein et al. | 214—1 X |

MARVIN A. CHAMPION, *Primary Examiner.*

UNITED STATES PATENT OFFICE
CERTIFICATE OF CORRECTION

Patent No. 3,282,444 November 1, 1966

William M. McConnell

It is hereby certified that error appears in the above numbered patent requiring correction and that the said Letters Patent should read as corrected below.

Column 1, lines 33 and 34, for "the pipe the pipe" read -- the pipe --; column 5, line 11, for "end" read -- and --.

Signed and sealed this 15th day of August 1967.

(SEAL)
Attest:

Edward M. Fletcher, Jr.

Attesting Officer

EDWARD J. BRENNER

Commissioner of Patents